(12) United States Patent
Nakamura et al.

(10) Patent No.: US 10,760,952 B2
(45) Date of Patent: Sep. 1, 2020

(54) PHOTOELECTRIC SENSOR COMPRISING AT LEAST ONE OF A LIGHT PROJECTING SIDE LIGHT GUIDE PART AND A LIGHT RECEIVING SIDE LIGHT GUIDE PART EXTENDS WITH AT LEAST A PART THEREOF INCLINED WITH RESPECT TO A PREDETERMINED DIRECTION

(71) Applicant: OMRON Corporation, Kyoto (JP)

(72) Inventors: Jumpei Nakamura, Kyoto (JP); Hiroyuki Mizusaki, Kyoto (JP); Motoki Tanaka, Kyoto (JP); Yasuhito Uetsuji, Kyoto (JP); Takahiro Okuda, Kyoto (JP)

(73) Assignee: OMRON Corporation, Kyoto (JP)

( * ) Notice: Subject to any disclaimer, the term of this patent is extended or adjusted under 35 U.S.C. 154(b) by 115 days.

(21) Appl. No.: 16/248,780

(22) Filed: Jan. 16, 2019

(65) Prior Publication Data

US 2019/0285462 A1    Sep. 19, 2019

(30) Foreign Application Priority Data

Mar. 14, 2018  (JP) .................. 2018-046494

(51) Int. Cl.
*G01J 1/02*  (2006.01)
*G01J 1/06*  (2006.01)
*G01J 1/42*  (2006.01)
*G01V 8/12*  (2006.01)

(52) U.S. Cl.
CPC ............. *G01J 1/0271* (2013.01); *G01J 1/06* (2013.01); *G01J 1/42* (2013.01); *G01V 8/12* (2013.01)

(58) Field of Classification Search
CPC .. G01V 8/12; G01J 1/0271; G01J 1/06; G01J 1/42; G01S 17/04; G01S 7/4813
USPC ...................... 250/239, 216, 214.1
See application file for complete search history.

(56) References Cited

U.S. PATENT DOCUMENTS

| 6,411,374 B2* | 6/2002 | Nakase ............... G01C 15/002 |
|---|---|---|
| | | 180/169 |
| 2007/0170380 A1 | 7/2007 | Tsuji |
| 2015/0198717 A1 | 7/2015 | Sawaguchi |

FOREIGN PATENT DOCUMENTS

| DE | 202014009922 | 1/2015 |
|---|---|---|
| DE | 102014216957 | 7/2015 |
| EP | 2752828 | 7/2014 |
| JP | 2013239578 | 11/2013 |

OTHER PUBLICATIONS

"Search Report of Europe Counterpart Application", dated Jul. 25, 2019, pp. 1-7.

* cited by examiner

*Primary Examiner* — Que Tan Le
(74) *Attorney, Agent, or Firm* — JCIPRNET (57) ABSTRACT

The disclosure provides a photoelectric sensor that reliably guides light by a light guide member and is easy to be assembled. A light projecting side light guide part of a light guide member extends in the front-and-rear direction. A light receiving side light guide part extends with at least a part thereof inclined with respect to the front-and-rear direction. A light shielding member includes a fitting part, into which the light projecting side light guide part fits in the front-and-rear direction, and a contact part that is in contact with a base board in the front-and-rear direction.

8 Claims, 9 Drawing Sheets

PHOTOELECTRIC SENSOR COMPRISING AT LEAST ONE OF A LIGHT PROJECTING SIDE LIGHT GUIDE PART AND A LIGHT RECEIVING SIDE LIGHT GUIDE PART EXTENDS WITH AT LEAST A PART THEREOF INCLINED WITH RESPECT TO A PREDETERMINED DIRECTION

CROSS-REFERENCE TO RELATED APPLICATION

This application claims the priority benefit of Japanese application serial no. 2018-046494, filed on Mar. 14, 2018. The entirety of the above-mentioned patent application is hereby incorporated by reference herein and made a part of this specification.

BACKGROUND

Technical Field

The disclosure relates to a photoelectric sensor.

Description of Related Art

A photoelectric sensor has been used as a device for detecting whether an object is present in the detection region, the surface condition of the object, etc. In the photoelectric sensor disclosed in Patent Document 1, a light projecting part for emitting light and a light receiving part for receiving light are housed inside a case. Two light guide paths are formed inside the case, and the light emitted by the light projecting part is emitted to the outside of the case through one light guide path. The light that enters from the outside of the case reaches the light receiving part through the other light guide path.

A photoelectric sensor, which has a light guide member disposed in each light guide path, is also known. The light guide member guides the light that enters inside while reflecting it at the boundary surface. By using such a light guide member, it is possible to increase the amount of light emitted to the outside of the case and the amount of light reaching the light receiving part from the outside of the case, and improve the detection accuracy of the object.

A photoelectric sensor, which guides light in two light guide paths by a single light guide member for reducing the number of parts used for the photoelectric sensor, is also known. However, for such a photoelectric sensor, the shape of the light guide member may become complicated and it may take a lot of effort to be assembled.

RELATED ART

Patent Document

[Patent Document 1] Japanese Laid-Open No. 2013-239578

SUMMARY

A photoelectric sensor according to an aspect of the disclosure includes: a case including a first case member and a second case member disposed opposite to the first case member, wherein a housing space is formed between the first case member and the second case member; a base board disposed in the housing space and mounted with a light projecting part for emitting light and a light receiving part for receiving light, which are separated from each other; a light guide member disposed in the housing space and including a light projecting side light guide part guiding light from the light projecting part to outside of the case, and a light receiving side light guide part guiding light from the outside of the case to the light receiving part; and a light shielding member disposed in the housing space, defining a positional relationship between the base board and the light guide member, and shielding light between the light projecting part and the light receiving part. One of the light projecting side light guide part and the light receiving side light guide part extends in a predetermined direction. The other one of the light projecting side light guide part and the light receiving side light guide part extends with at least a part thereof inclined with respect to the predetermined direction. The light shielding member includes a fitting part, into which the one of the light projecting side light guide part and the light receiving side light guide part fits in the predetermined direction, and a contact part that is in contact with the base board in the predetermined direction.

DESCRIPTION OF THE EMBODIMENTS

The disclosure provides a photoelectric sensor that reliably guides light by a light guide member and is easy to be assembled.

A photoelectric sensor according to an aspect of the disclosure includes: a case including a first case member and a second case member disposed opposite to the first case member, wherein a housing space is formed between the first case member and the second case member; a base board disposed in the housing space and mounted with a light projecting part for emitting light and a light receiving part for receiving light, which are separated from each other; a light guide member disposed in the housing space and including a light projecting side light guide part guiding light from the light projecting part to outside of the case, and a light receiving side light guide part guiding light from the outside of the case to the light receiving part; and a light shielding member disposed in the housing space, defining a positional relationship between the base board and the light guide member, and shielding light between the light projecting part and the light receiving part. One of the light projecting side light guide part and the light receiving side light guide part extends in a predetermined direction. The other one of the light projecting side light guide part and the light receiving side light guide part extends with at least a part thereof inclined with respect to the predetermined direction. The light shielding member includes a fitting part, into which the one of the light projecting side light guide part and the light receiving side light guide part fits in the predetermined direction, and a contact part that is in contact with the base board in the predetermined direction.

According to this aspect, while one of the light projecting side light guide part and the light receiving side light guide part extends in the predetermined direction, the other one of the light projecting side light guide part and the light receiving side light guide part extends with at least a part thereof inclined with respect to the predetermined direction. Therefore, even if the light projecting part and the light receiving part are separated from each other and mounted on the base board, it is possible to reliably guide light for them respectively.

One of the light projecting side light guide part and the light receiving side light guide part fits into the fitting part of the light shielding member in the predetermined direction. In addition, the contact part of the light shielding member is in contact with the base board in the predetermined direction. Therefore, both the fitting into the light shielding member and the contact between the light shielding member and the base board can be performed in one single direction. Accordingly, the photoelectric sensor can be assembled easily.

In the above aspect, the second case member may be disposed opposite to the first case member in the predetermined direction.

According to this aspect, in addition to the fitting into the light shielding member and the contact between the light shielding member and the base board, the opposite arrangement of the first case member and the second case member can also be performed in one single direction. Accordingly, the photoelectric sensor can be assembled more easily.

In the above aspect, the light shielding member may include a barrier wall that separates the light projecting side light guide part and the light receiving side light guide part near the base board.

If the light emitted from the light projecting part reaches the light receiving part directly without being emitted to the outside of the case, the photoelectric sensor will generate erroneous detection. According to this aspect using the barrier wall, such a light path can be blocked by the barrier wall to suppress erroneous detection. Further, since the light shielding member has the barrier wall, it is possible to suppress an increase in the number of parts.

In the above aspect, the light projecting side light guide part may be formed to extend in the predetermined direction, the light receiving side light guide part may be formed to extend with at least a part thereof inclined with respect to the predetermined direction, and the light projecting side light guide part may fit into the fitting part.

According to this aspect, the light emitted from the light projecting part can be efficiently guided to the outside of the case. As a result, it is possible to suppress the power required for the operation of the photoelectric sensor.

In the above aspect, the light shielding member may include a shielding wall that shields the light projecting part, and the shielding wall may be formed with a through hole.

According to this aspect, the shielding wall formed with the through hole can be used as an aperture. As a result, it is possible to adjust the directivity of the light that is emitted from the light projecting part and reaches the light projecting side light guide part.

According to the disclosure, it is possible to provide a photoelectric sensor that reliably guides light by a light guide member and is easy to be assembled.

An embodiment of the disclosure will be described below with reference to the accompanying drawings. In the respective drawings, parts denoted by the same reference numerals have the same or similar configurations.

Figure 1:
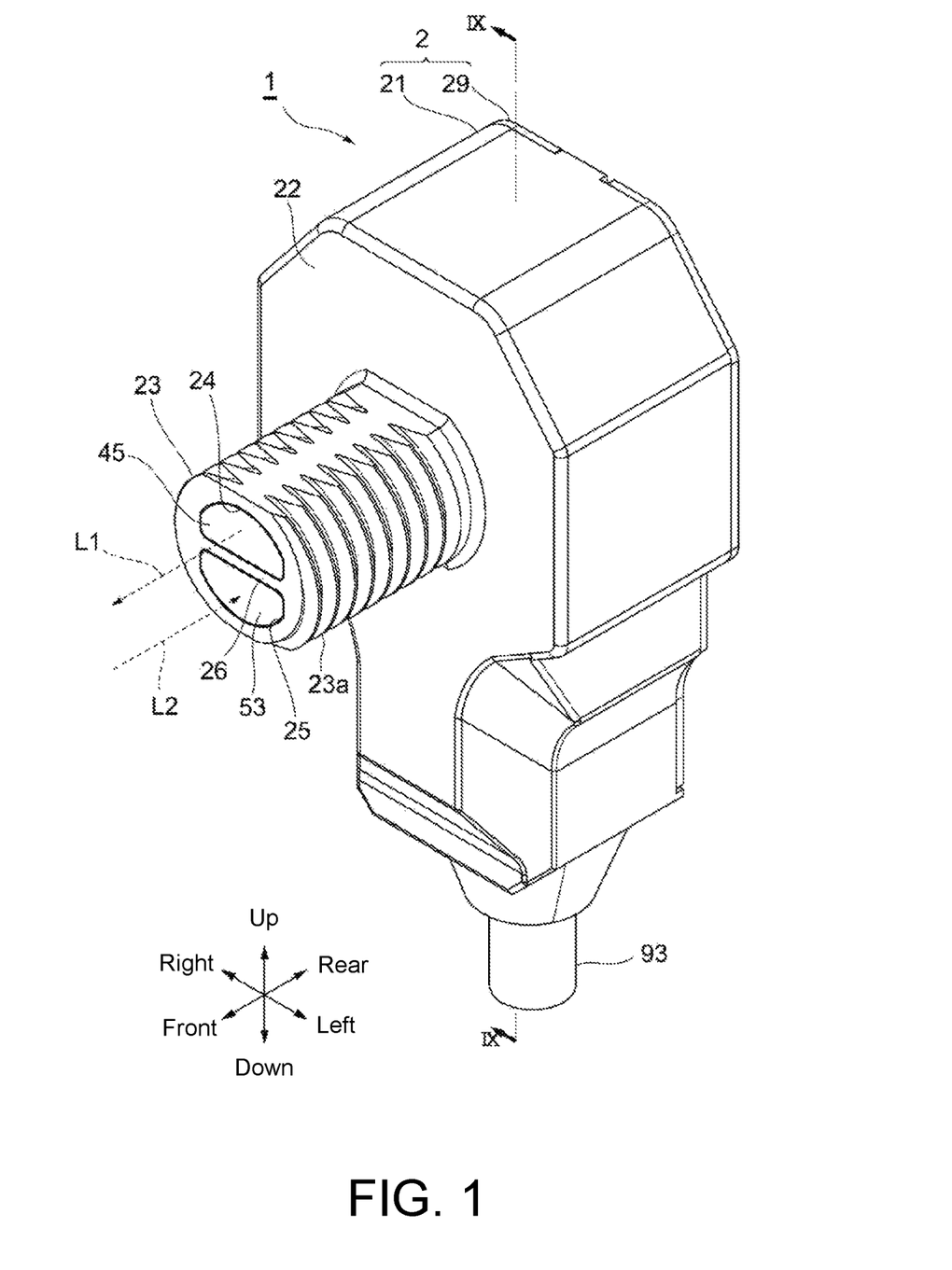
FIG. 1 is a perspective view showing the photoelectric sensor according to an embodiment.

In this specification, as shown in FIG. 1, the direction indicated by the arrow L1 (to be described later) is referred to as "front" and the direction indicated by the arrow L2 is referred to as "rear". In addition, when facing toward the front side, the left side is referred to as "left" and the right side is referred to as "right". Further, the upper side is referred to as "up" and the lower side is referred to as "down". Nevertheless, the designation of these directions does not limit the form of use of the disclosure.

First, the outline of a photoelectric sensor 1 according to the embodiment will be described with reference to FIG. 1. FIG. 1 is a perspective view showing the photoelectric sensor 1.

The photoelectric sensor 1 includes a case 2 and a cable 93. The case 2 includes a first case member 21 and a second case member 29. On the first case member 21, a protrusion 23 is formed to protrude toward the front side from a main body part 22 of the first case member 21. The protrusion 23 has a substantially cylindrical shape, and the inside of the protrusion 23 is divided into a light projecting side light guide path 24 and a light receiving side light guide path 25 by a partition wall 26. An exit surface 45 of a light guide member 3 (to be described later) is disposed in the light projecting side light guide path 24 and an entrance surface 53 is disposed in the light receiving side light guide path 25.

A screw part 23a is formed on the outer peripheral surface of the protrusion 23. The screw part 23a is a male screw and has a helical shape with the front-and-rear direction as the axial direction. For example, the protrusion 23 is inserted into a through hole (not shown) formed in a jig and a nut (not shown) is screwed to the screw part 23a of the protrusion 23, so as to fix the photoelectric sensor 1 to the jig. The photoelectric sensor 1 is arranged with the exit surface 45 and the entrance surface 53 facing toward the front side of the photoelectric sensor 1 where a detection region (not shown) exists.

The photoelectric sensor 1 receives power supply via the cable 93 and emits light from the exit surface 45. The light can be visible light, for example, but the wavelength, etc. of the light is not limited if the light is reflected by the surface of the object. The light emitted from the exit surface 45 travels toward the front side as indicated by the arrow L1.

On the other hand, light enters the entrance surface 53 from the front side as indicated by the arrow L2. The photoelectric sensor 1 generates an electric signal corresponding to the amount of light that enters the entrance surface 53 and performs a predetermined calculation based on the electric signal.

When no object is present in the detection region, the amount of light that enters the entrance surface 53 is very small. On the other hand, when an object is present in the detection region, the light emitted from the exit surface 45 is reflected by the surface of the object and directed to the photoelectric sensor 1, so the amount of light that enters the entrance surface 53 increases.

Thus, the amount of light that enters the entrance surface 53 differs depending on whether an object is present in the detection region. The photoelectric sensor 1 detects whether an object is present, the surface condition of the object, etc. based on the difference in light amount. For example, the photoelectric sensor 1 detects whether an object is present in the detection region based on comparison between the amount of light that enters the entrance surface 53 and a predetermined threshold value.

Figure 2:
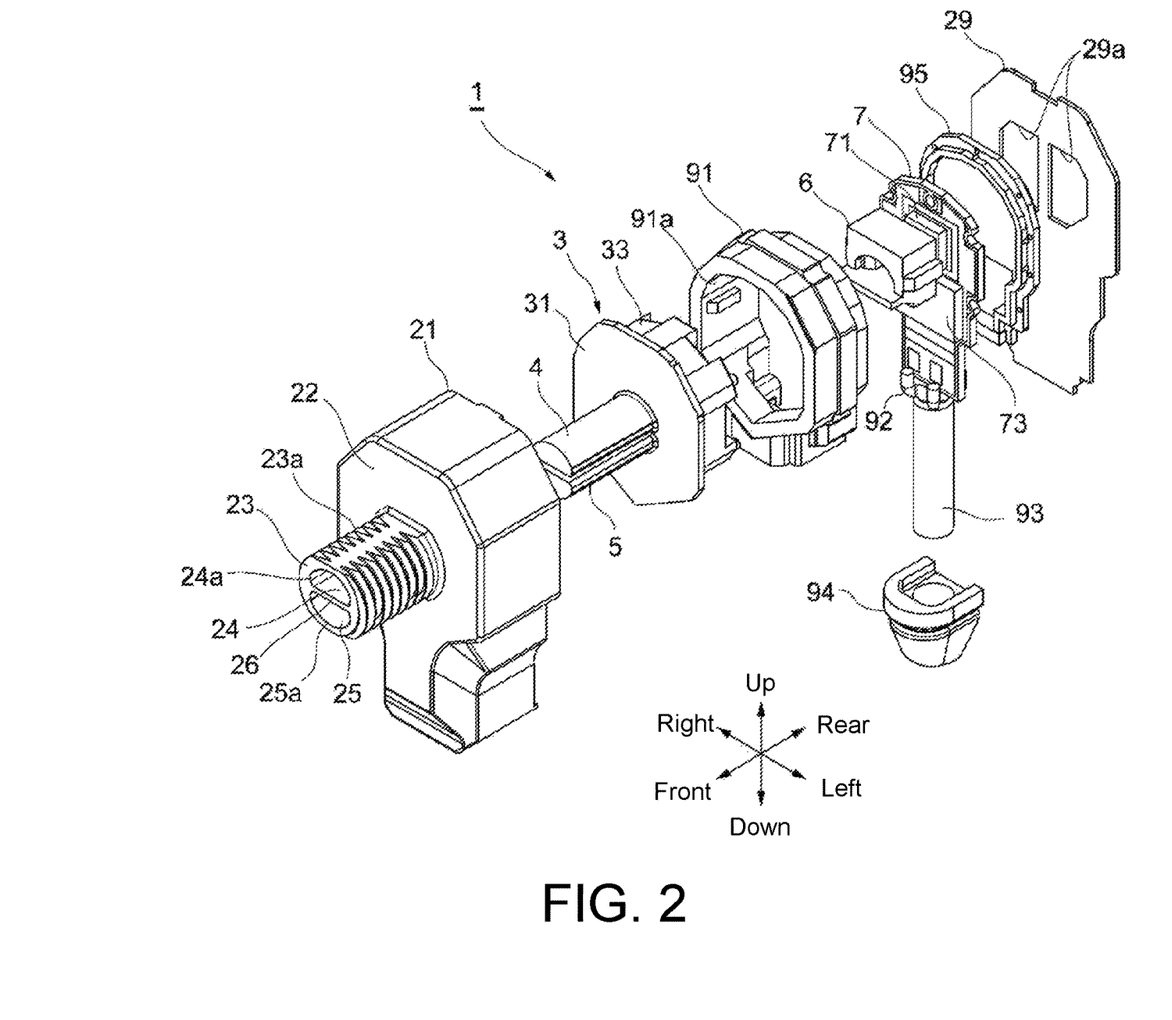
FIG. 2 is an exploded perspective view of the photoelectric sensor of FIG. 1.
Figure 3:
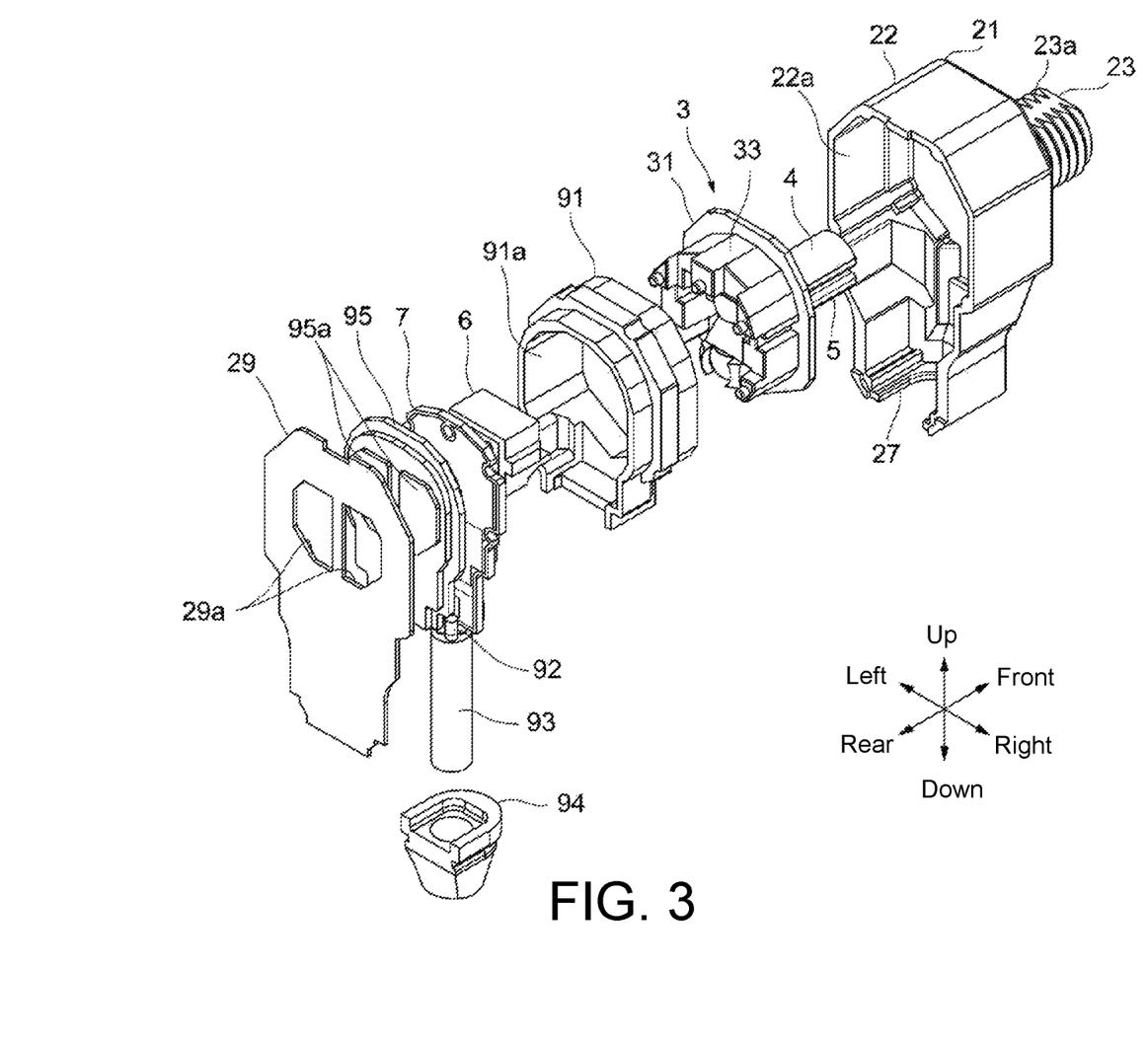
FIG. 3 is an exploded perspective view of the photoelectric sensor of FIG. 1.
Figure 4:
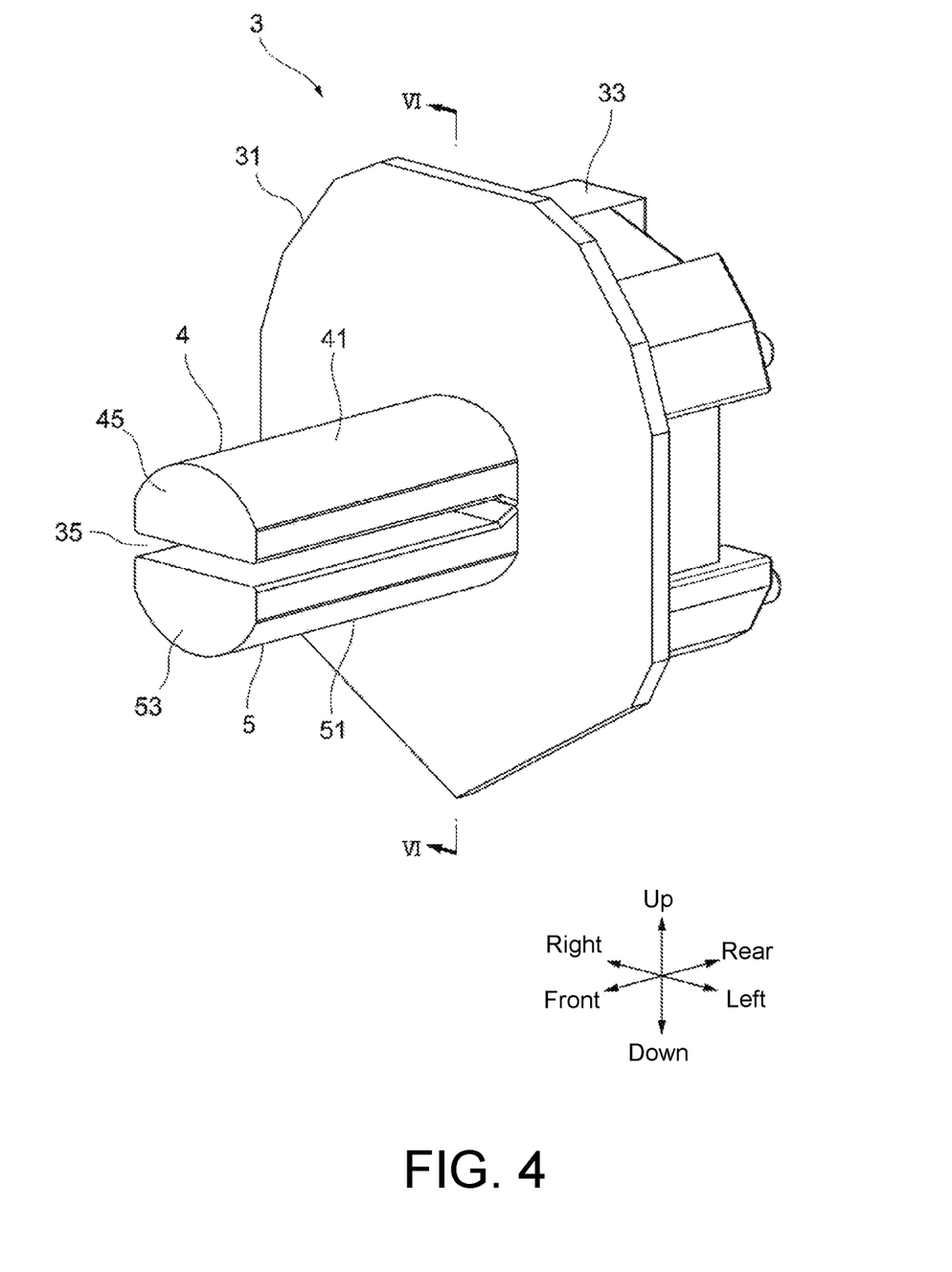
FIG. 4 is a perspective view showing the light guide member of FIG. 2.
Figure 5:
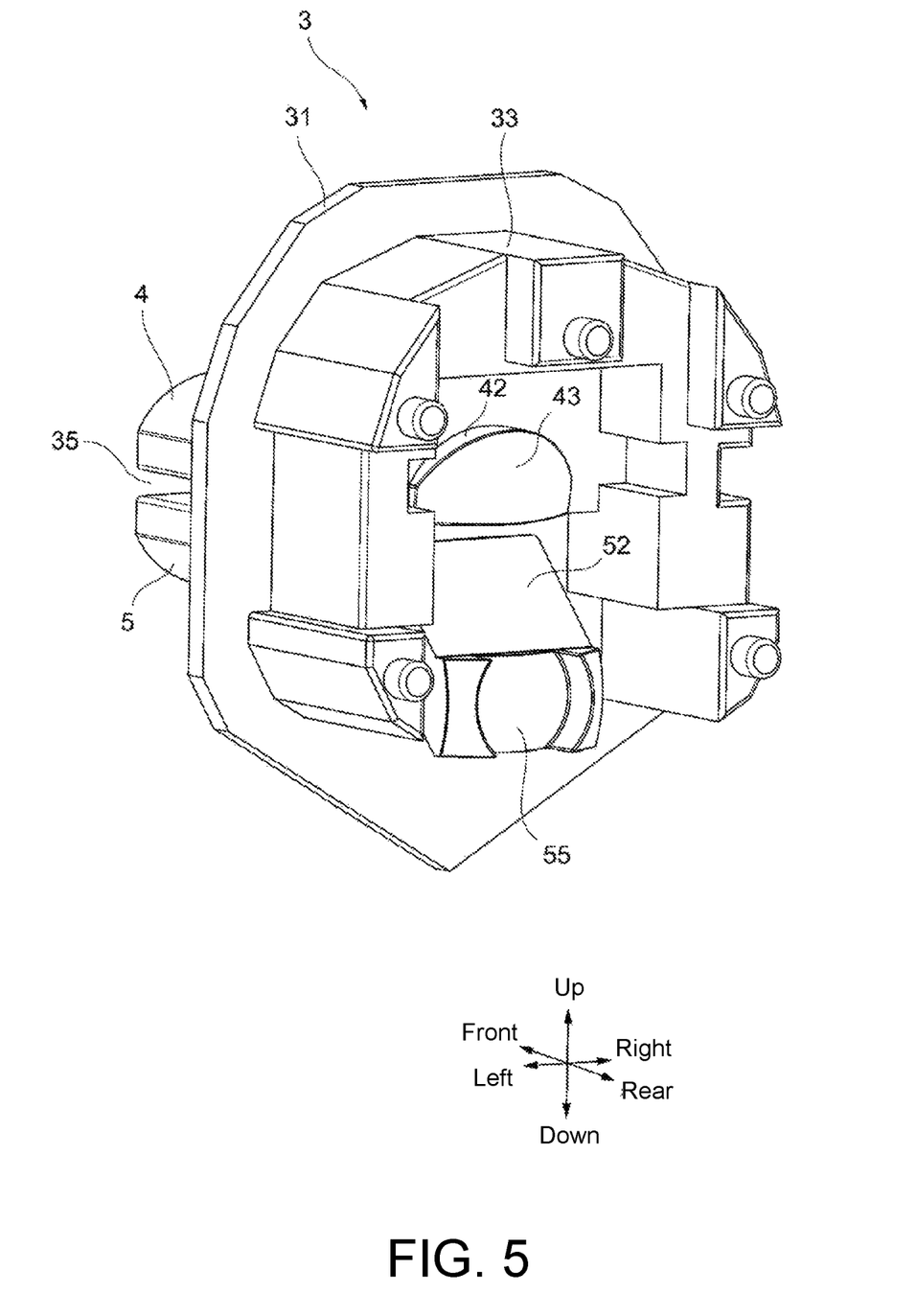
FIG. 5 is a perspective view showing the light guide member of FIG. 2.
Figure 6:
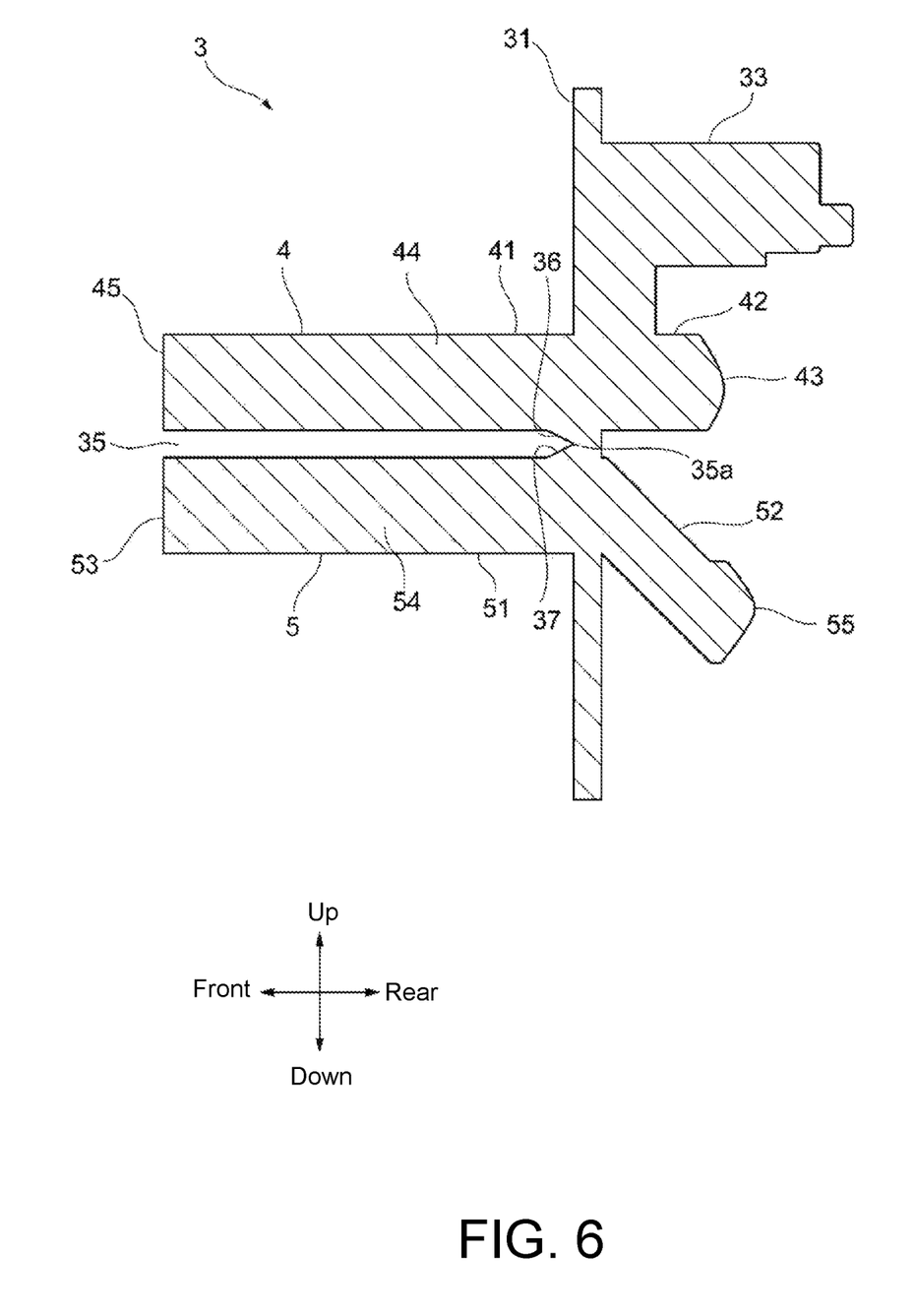
FIG. 6 is a cross-sectional view showing the VI-VI cross section of FIG. 4.
Figure 7:
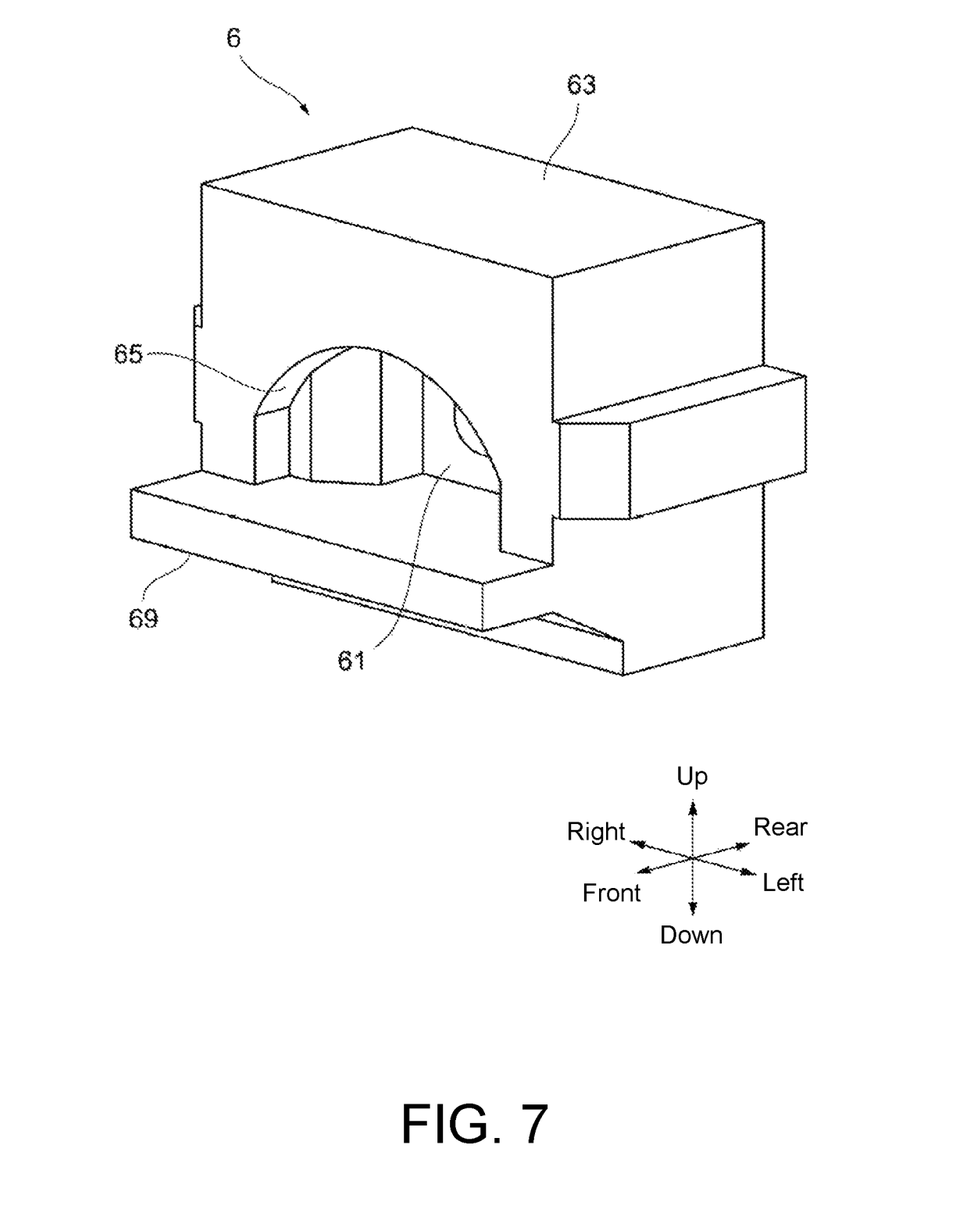
FIG. 7 is a perspective view showing the light shielding member of FIG. 2.
Figure 8:
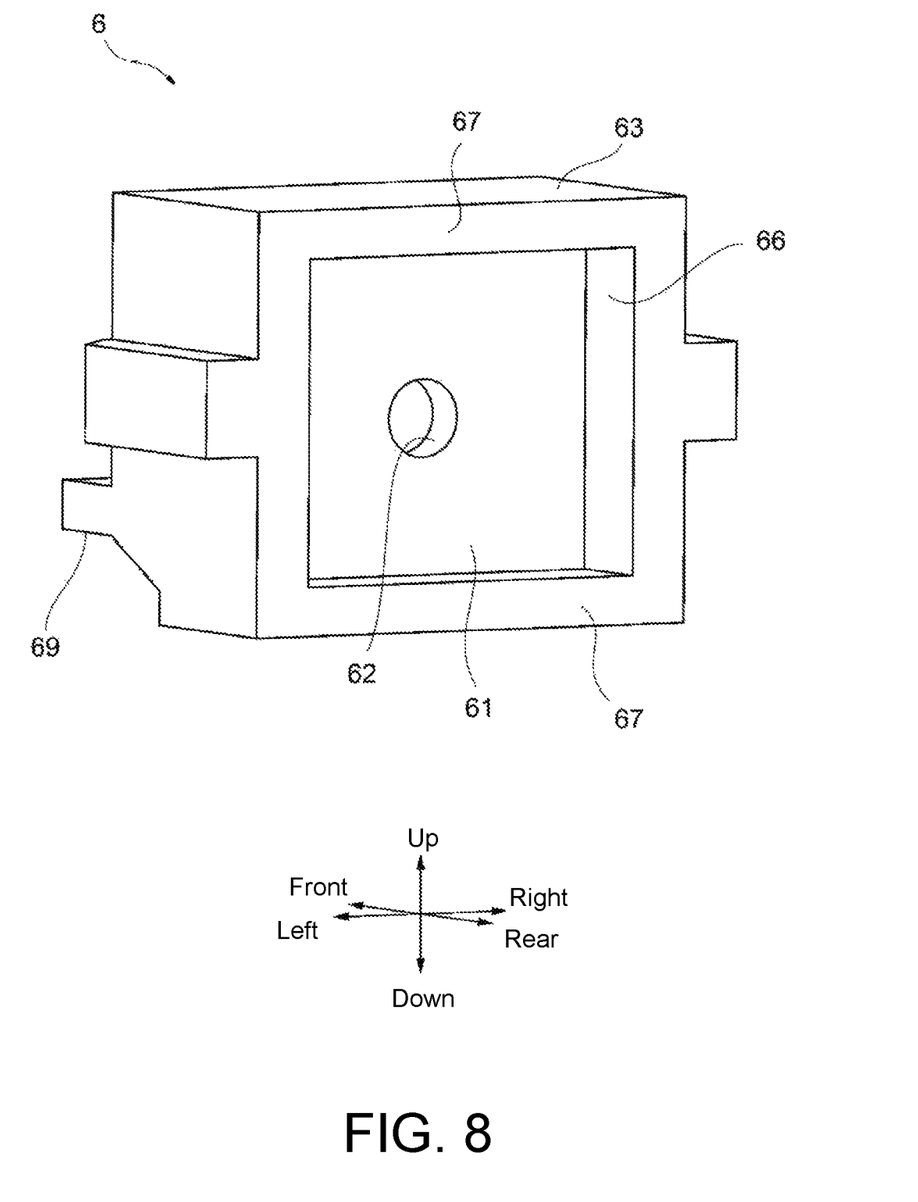
FIG. 8 is a perspective view showing the light shielding member of FIG. 2.

Next, parts housed in the case 2 will be described with reference to FIG. 2 to FIG. 8. FIG. 2 and FIG. 3 are exploded perspective views showing the photoelectric sensor 1. FIG. 4 and FIG. 5 are perspective views showing the light guide member 3. FIG. 6 is a cross-sectional view showing the VI-VI cross section of FIG. 4. FIG. 7 and FIG. 8 are perspective views showing a light shielding member 6.

As described above, the case 2 includes the first case member 21 and the second case member 29. As shown in FIG. 3, a recess 22a is formed in the rear portion of the main body part 22 of the first case member 21. Further, a notch 27 communicating with the recess 22a is formed at the lower end of the main body part 22. The second case member 29 has a substantially flat plate shape and is formed with two holes 29a that penetrate in the thickness direction. The second case member 29 is disposed on the rear side of the first case member 21 and faces the first case member 21 in the front-and-rear direction. The second case member 29 covers the recess 22a of the first case member 21, so as to form a housing space between the first case member 21 and the second case member 29.

As shown in FIG. 2 and FIG. 3, the light guide member 3, the light shielding member 6, and a base board 7 are disposed in the housing space of the case 2.

The light guide member 3 is made of a light-transmitting material such as acrylic or glass. The light guide member 3 includes a light projecting side light guide part 4, a light receiving side light guide part 5, and a connecting part 31.

As shown in FIG. 6, the light projecting side light guide part 4 has a protrusion 41 that protrudes toward the front side from the connecting part 31, and a protrusion 42 that protrudes toward the rear side. The connecting part 31 has a substantially flat plate shape with the front-and-rear direction as the thickness direction. The protrusion 41 has the exit surface 45 which is a flat surface at the front end. Moreover, the protrusion 42 has an entrance surface 43 which is a curved surface at the rear end. Both the protrusion 41 and the protrusion 42 protrude along the front-and-rear direction. Therefore, the light projecting side light guide part 4 extends linearly between the entrance surface 43 and the exit surface 45.

The light receiving side light guide part 5 has a protrusion 51 that protrudes toward the front side from the connecting part 31, and a protrusion 52 that protrudes toward the rear side. The protrusion 51 has the entrance surface 53 which is a flat surface at the front end. Moreover, the protrusion 52 has an exit surface 55 which is a curved surface at the rear end.

While the protrusion 51 protrudes along the front-and-rear direction, the protrusion 52 protrudes in a direction inclined with respect to the front-and-rear direction. To be more specific, the protrusion 52 protrudes downward away from the protrusion 41 at an angle of approximately 45° with respect to the front-and-rear direction. Therefore, the light receiving side light guide part 5 extends from the entrance surface 53 to the exit surface 55 to bend at the connecting part 31.

The light projecting side light guide part 4 and the light receiving side light guide part 5 are spaced apart from each other in the up-and-down direction and connected by the connecting part 31. In other words, the light receiving side light guide part 5 is disposed below the light projecting side light guide part 4 with a gap 35 formed between the light receiving side light guide part 5 and the light projecting side light guide part 4.

As shown in FIG. 6, a reduction part 35a is provided at the end portion of the gap 35 on the side of the connecting part 31. The reduction part 35a is formed by a plane surface 36 and a plane surface 37. The plane surface 36 and the plane surface 37 are connected to each other to form an acute angle. Therefore, the gap 35 extends with a constant dimension from the front end to the reduction part 35a, and the dimension gradually decreases toward the rear side in the reduction part 35a.

The rear surface of the connecting part 31 is provided with a surrounding wall 33. As shown in FIG. 5, the surrounding wall 33 protrudes toward the rear side from the rear surface of the connecting part 31 and surrounds the upper side, the left side, and the right side of the protrusion 42 of the light projecting side light guide part 4 and the protrusion 52 of the light receiving side light guide part 5.

The light shielding member 6 is made of a non-light-transmitting material. As shown in FIG. 7 and FIG. 8, the light shielding member 6 includes a shielding wall 61, a peripheral wall 63, and a barrier wall 69. The shielding wall 61 has a substantially flat plate shape with the front-and-rear direction as the thickness direction. A through hole 62 is formed at the substantially central portion of the shielding wall 61. The through hole 62 has a substantially circular cross section and penetrates the shielding wall 61 in the front-and-rear direction. The peripheral wall 63 is disposed on the peripheral portion of the shielding wall 61 and extends in the front-and-rear direction. A fitting part 65 is formed on the front side of the shielding wall 61, and a recess 66 is formed on the rear side of the shielding wall 61. The peripheral wall 63 has a contact part 67 which is a flat surface at the rear end.

As shown in FIG. 2 and FIG. 3, the base board 7 has a substantially flat plate shape. As shown in FIG. 2, a light projecting part 71 and a light receiving part 73 are mounted on the front surface of the base board 7. The light projecting part 71 includes a light emitting element (not shown) such as a light emitting diode, and the light receiving part 73 includes a light receiving element (not shown) such as a photodiode. The light receiving part 73 is disposed below the light projecting part 71 and separated from the light projecting part 71. The cable 93 is connected to the lower end of the base board 7 via a connector 92. The cable 93 is flexible and is inserted through a cable holder 94. The cable holder 94 is formed of an elastic resin material or the like and can be deformed to follow the cable 93.

In addition, a holder 91 and a plate 95 are disposed in the housing space of the case 2. The holder 91 and the plate 95 are members used for fixing the light guide member 3, the light shielding member 6, and the base board 7 in the housing space. The holder 91 is formed with a hole 91a and has a substantially annular shape as a whole. The plate 95 has a substantially flat plate shape and is formed with two protrusions 95a on the rear surface, as shown in FIG. 3.

Figure 9:
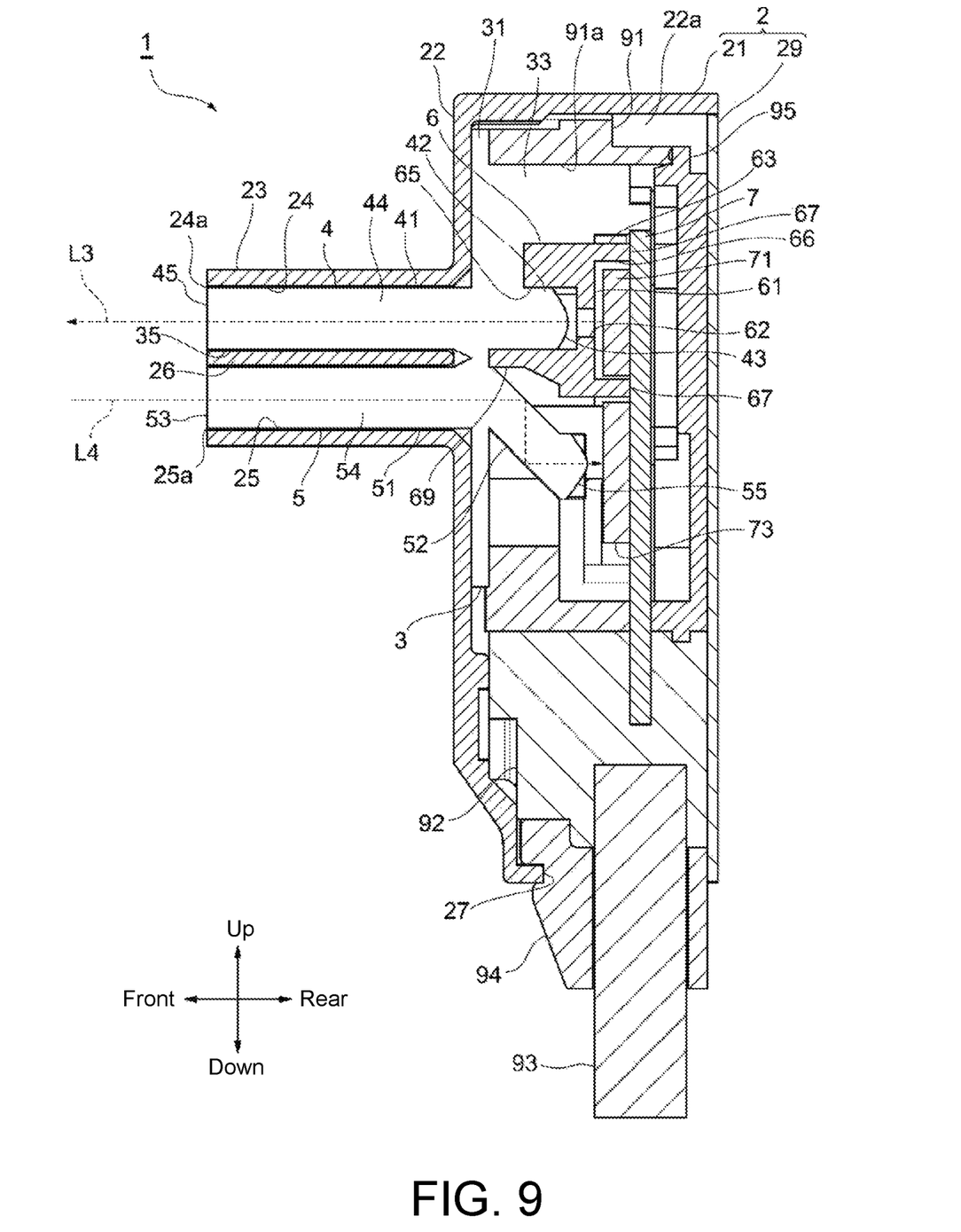
FIG. 9 is a cross-sectional view showing the IX-IX cross section of FIG. 1.

Next, the arrangement of each part in the housing space of the case 2 will be described with reference to FIG. 9. FIG. 9 is a cross-sectional view showing the IX-IX cross section of FIG. 1. In FIG. 9, hatching of the cross section of the light guide member 3 is omitted.

When the photoelectric sensor 1 is assembled, a part of the light guide member 3 is inserted into the protrusion 23 of the first case member 21. To be more specific, the protrusion 41 of the light projecting side light guide part 4 is inserted into the light projecting side light guide path 24 and the protrusion 51 of the light receiving side light guide part 5 is inserted into the light receiving side light guide path 25. Both the protrusion 41 and the protrusion 51 are inserted along the front-and-rear direction from the rear side of the first case member 21. At this time, the partition wall 26 of the first case member 21 is inserted into the gap 35 of the light guide member 3.

When the insertion of the light projecting side light guide part 4 into the light projecting side light guide path 24 and the insertion of the light receiving side light guide part 5 into the light receiving side light guide path 25 are completed, the exit surface 45 is disposed at the front end 24a of the light projecting side light guide path 24 and the entrance surface 53 is disposed at the front end 25a of the light receiving side light guide path 25. Thus, at the front end of the protrusion 23 of the first case member 21, the exit surface 45 and the entrance surface 53 are arranged adjacent to each other in the up-and-down direction with the partition wall 26 interposed therebetween.

The holder 91 is attached to the light guide member 3 from the rear side. The holder 91 is attached such that the surrounding wall 33 of the light guide member 3 is inserted into the hole 91a and the holder 91 is in contact with the rear surface of the connecting part 31 in the front-and-rear direction.

The light shielding member 6 is attached to the light guide member 3 from the rear side. The light shielding member 6 is attached so that the protrusion 42 of the light projecting side light guide part 4 of the light guide member 3 is fitted into the fitting part 65 of the light shielding member 6 from the front side. When the attachment of the light shielding member 6 to the light guide member 3 is completed, the barrier wall 69 of the light shielding member 6 is disposed between the protrusion 42 of the light projecting side light guide part 4 and the protrusion 52 of the light receiving side light guide part 5. In other words, the barrier wall 69 separates the light projecting side light guide part 4 and the light receiving side light guide part 5 in the up-and-down direction and shields light between the light projecting part 71 and the light receiving part 73.

The base board 7 is attached to the light guide member 3 from the rear side. To be more specific, the base board 7 is disposed inside the surrounding wall 33 of the light guide member 3. In addition, the base board 7 is disposed to be in contact with the contact part 67 of the light shielding member 6 and the holder 91 in the front-and-rear direction on the front surface. By bringing the contact part 67 of the light shielding member 6 into contact with the front surface of the base board 7, the positional relationship between the base board 7 and the light guide member 3 in the front-and-rear direction is defined.

When the base board 7 is attached to the light guide member 3, the connector 92 is disposed in the recess 22a of the first case member 21 and the cable holder 94 is engaged with the notch 27 of the first case member 21. In addition, the light projecting part 71 is disposed in the recess 66 of the light shielding member 6. The periphery of the light projecting part 71 is surrounded by the peripheral wall 63 and the front thereof is shielded by the shielding wall 61. Thus, the light projecting part 71 faces the entrance surface 43 of the light guide member 3 in the front-and-rear direction with the shielding wall 61 interposed therebetween. Furthermore, the light receiving part 73 faces the exit surface 55 of the light guide member 3 in the front-and-rear direction.

The plate 95 is attached to the holder 91 and the base board 7 from the rear side. The plate 95 is disposed to be in contact with the rear end of the holder 91 and the rear surface of the base board 7 on the front surface.

The second case member 29 is attached to the first case member 21 from the rear side. The second case member 29 is disposed to be in contact with the rear end portion of the first case member 21 and to cover the plate 95. The protrusions 95a (see FIG. 3) of the plate 95 are fitted into the holes 29a (see FIG. 2 and FIG. 3) of the second case member 29.

The photoelectric sensor 1 configured as described above receives power supply via the cable 93. The light emitting element of the light projecting part 71 receives the power supply and emits light toward the front side. A part of the light passes through the through hole 62 of the light shielding member 6 and then enters the entrance surface 43 of the light guide member 3, as indicated by the arrow L3. The arrow L3 illustrates one of the traveling directions of the light emitted from the light projecting part 71.

The light that enters the entrance surface 43 reaches the inside 44 of the light projecting side light guide part 4. The light projecting side light guide part 4 guides a part of the light directly to the exit surface 45, as indicated by the arrow L3. In addition, the light projecting side light guide part 4 guides another part of the light to the exit surface 45 while reflecting it at the boundary surface. The exit surface 45 emits the light that comes from the rear side toward the detection region on the front side.

On the other hand, the light that comes from the detection region enters the entrance surface 53 of the light guide member 3, as indicated by the arrow L4. The arrow L4 illustrates one of the traveling directions of the light that enters the entrance surface 53.

The light that enters the entrance surface 53 reaches the inside 54 of the light receiving side light guide part 5. The light receiving side light guide part 5 guides a part of the light directly to the protrusion 52, as indicated by the arrow L4. In addition, the light receiving side light guide part 5 guides another part of the light to the protrusion 52 while reflecting it at the boundary surface.

As described above, the protrusion 52 protrudes downward away from the protrusion 41 at an angle of approximately 45° with respect to the front-and-rear direction. Therefore, the light that reaches the protrusion 52 is guided downward and rearward while being reflected at the boundary surface of the protrusion 52, and reaches the exit surface 55, as indicated by the arrow L4. The light is emitted from the exit surface 55 and reaches the light receiving part 73. The photoelectric sensor 1 detects whether an object is present in the detection region, the surface condition of the object, etc. based on the amount of light received by the light receiving part 73, as described above.

As described above, the photoelectric sensor 1 according to the embodiment includes:

the case 2 including the first case member 21 and the second case member 29 disposed opposite to the first case member 21, wherein the housing space is formed between the first case member 21 and the second case member; the base board 7 disposed in the housing space and mounted with the light projecting part 71 for emitting light and the light receiving part 73 for receiving light, which are separated from each other; the light guide member 3 disposed in the housing space and including the light projecting side light guide part 4 guiding light from the light projecting part 71 to the outside of the case 2, and the light receiving side light guide part 5 guiding light from the outside of the case 2 to the light receiving part 73; and the light shielding member 6 disposed in the housing space and defining the positional relationship between the base board 7 and the light guide member 3. The light projecting side light guide part 4 extends in the front-and-rear direction. The light receiving side light guide part 5 extends with at least a part thereof inclined with respect to the front-and-rear direction. The light shielding member 6 includes the fitting part 65, into which the light projecting side light guide part 4 fits in the front-and-rear direction, and the contact part 67 that is in contact with the base board 7 in the front-and-rear direction.

According to this aspect, while the light projecting side light guide part 4 extends in the front-and-rear direction, the light receiving side light guide part 5 extends with at least a part thereof inclined with respect to the front-and-rear direction. Therefore, even if the light projecting part 71 and the light receiving part 73 are separated from each other and mounted on the base board 7, it is possible to reliably guide light for them respectively.

The light projecting side light guide part 4 fits into the fitting part 65 of the light shielding member 6 in the front-and-rear direction. In addition, the contact part 67 of the light shielding member 6 is in contact with the base board 7 in the front-and-rear direction. Since both the fitting into the light shielding member 6 and the contact between the light shielding member 6 and the base board 7 can be performed in the front-and-rear direction, the photoelectric sensor 1 can be assembled easily.

In addition, the second case member 29 is disposed opposite to the first case member 21 in the front-and-rear direction. According to this aspect, in addition to the fitting into the light shielding member 6 and the contact between the light shielding member 6 and the base board 7, the opposite arrangement of the first case member 21 and the second case member 29 can also be performed in the front-and-rear direction. Thus, the photoelectric sensor 1 can be assembled more easily.

Furthermore, the light shielding member 6 has the barrier wall 69 that separates the light projecting side light guide part 4 and the light receiving side light guide part 5 near the base board 7. According to this aspect, the path of the light that is emitted from the light projecting part 71 and directly reaches the light receiving part 73 without being emitted to the outside of the case 2 can be blocked by the barrier wall 69 to suppress erroneous detection of the photoelectric sensor 1. Further, since the light shielding member 6 has the barrier wall 69, it is possible to suppress an increase in the number of parts.

In addition, the light projecting side light guide part 4 is formed to extend in the front-and-rear direction. The light receiving side light guide part 5 is formed to extend with at least a part thereof inclined with respect to the front-and-rear direction. Then, the light projecting side light guide part 4 fits into the fitting part 65. According to this aspect, the light emitted from the light projecting part 71 can be efficiently guided to the outside of the case 2. As a result, it is possible to suppress the power required for the operation of the photoelectric sensor 1.

Furthermore, the light shielding member 6 has the shielding wall 61 that shields the light projecting part 71. The shielding wall 61 is formed with the through hole 62. According to this aspect, the shielding wall 61 formed with the through hole 62 can be used as an aperture. As a result, it is possible to adjust the directivity of the light that is emitted from the light projecting part 71 and reaches the light projecting side light guide part 4.

The embodiment of the disclosure has been described above with reference to specific examples. However, the disclosure is not limited to these specific examples. That is, appropriate design modifications that those skilled in the art make to these specific examples are also included in the scope of the disclosure as long as they have the features of the disclosure. The elements and their arrangements, materials, conditions, shapes, sizes, etc. of each specific example described above are not limited to those exemplified and can be modified appropriately.

In the above embodiment, the light projecting side light guide part 4 fits into the fitting part 65 of the light shielding member 6 and a part of the light receiving side light guide part 5 extends to be inclined with respect to the front-and-rear direction. However, the disclosure is not limited to this aspect. For example, the light projecting side light guide part may extend with at least a part thereof inclined with respect to a predetermined direction and the light receiving side light guide part may be formed to extend along the predetermined direction, and the light receiving side light guide part may fit into the fitting part of the light shielding member.

What is claimed is:

1. A photoelectric sensor, comprising:
    a case comprising a first case member and a second case member disposed opposite to the first case member, wherein a housing space is formed between the first case member and the second case member;
    a base board disposed in the housing space and mounted with a light projecting part for emitting light and a light receiving part for receiving light, which are separated from each other;
    a light guide member disposed in the housing space and comprising a light projecting side light guide part guiding light from the light projecting part to outside of the case, and a light receiving side light guide part guiding light from the outside of the case to the light receiving part; and
    a light shielding member disposed in the housing space, defining a positional relationship between the base board and the light guide member, and shielding light between the light projecting part and the light receiving part,
    wherein one of the light projecting side light guide part and the light receiving side light guide part extends in a predetermined direction,
    the other one of the light projecting side light guide part and the light receiving side light guide part extends with at least a part thereof inclined with respect to the predetermined direction, and
    the light shielding member comprises a fitting part, into which the one of the light projecting side light guide part and the light receiving side light guide part fits in the predetermined direction, and a contact part that is in contact with the base board in the predetermined direction.

2. The photoelectric sensor according to claim 1, wherein the second case member is disposed opposite to the first case member in the predetermined direction.

3. The photoelectric sensor according to claim 1, wherein the light shielding member comprises a barrier wall that separates the light projecting side light guide part and the light receiving side light guide part near the base board.

4. The photoelectric sensor according to claim 3, wherein the light projecting side light guide part is formed to extend in the predetermined direction,
    the light receiving side light guide part is formed to extend with at least a part thereof inclined with respect to the predetermined direction, and
    the light projecting side light guide part fits into the fitting part.

5. The photoelectric sensor according to claim 4, wherein the light shielding member comprises a shielding wall that shields the light projecting part, and the shielding wall is formed with a through hole.

6. The photoelectric sensor according to claim 2, wherein the light shielding member comprises a barrier wall that separates the light projecting side light guide part and the light receiving side light guide part near the base board.

7. The photoelectric sensor according to claim 6, wherein the light projecting side light guide part is formed to extend in the predetermined direction, the light receiving side light guide part is formed to extend with at least a part thereof inclined with respect to the predetermined direction, and the light projecting side light guide part fits into the fitting part.

8. The photoelectric sensor according to claim 7, wherein the light shielding member comprises a shielding wall that shields the light projecting part, and the shielding wall is formed with a through hole.

* * * * *